(12) United States Patent
Gueler et al.

(10) Patent No.: US 7,244,213 B2
(45) Date of Patent: Jul. 17, 2007

(54) DRIVE ARRANGEMENT FOR A MOTOR VEHICLE DOOR OR HATCH WHICH CAN BE MOVED BY A MOTOR

(75) Inventors: Mehmet Gueler, Recklinghausen (DE); Slawomir Kortyrba, Wuppertal (DE); Andreas Heinrich, Heiligenhaus (DE); Peter Bartel, Hattingen (DE); Axel Kamberg, Kerpen-Horren (DE)

(73) Assignee: Brose Schliesssysteme GmbH & Co. KG, Wuppertal (DE)

( * ) Notice: Subject to any disclaimer, the term of this patent is extended or adjusted under 35 U.S.C. 154(b) by 202 days.

(21) Appl. No.: 11/143,928

(22) Filed: Jun. 3, 2005

(65) Prior Publication Data
US 2005/0277512 A1  Dec. 15, 2005

(30) Foreign Application Priority Data
Jun. 4, 2004  (DE) ................... 10 2004 027 533
Oct. 25, 2004  (DE) ................. 20 2004 016 542 U (51) Int. Cl.
*F16H 3/44* (2006.01)
(52) U.S. Cl. ...................................... 475/317; 292/199
(58) Field of Classification Search ................ 475/311, 475/317, 323; 292/199, 201
See application file for complete search history.

(56) References Cited

U.S. PATENT DOCUMENTS 4,334,440 A * 6/1982 Fonck ........................ 475/330
5,390,347 A * 2/1995 Buri et al. ................... 475/303
6,085,880 A * 7/2000 Kuhn et al. ................. 192/3.52
6,125,586 A   10/2000 Buscher
6,142,551 A   11/2000 Ciavaglia et al.
6,460,295 B1  10/2002 Johnson et al.
6,582,339 B2 * 6/2003 Damm et al. ............... 475/317
2004/0097318 A1  5/2004 Greuel et al.
2005/0173219 A1  8/2005 Bittner et al.

FOREIGN PATENT DOCUMENTS

DE       40 41 480 A1    6/1992
DE      199 35 589 A1    2/2001
JP         58134252 A *  8/1983
JP         01316550 A * 12/1989
WO     WO 03/104671 A1  12/2003

* cited by examiner

Primary Examiner—Ha Ho
(74) Attorney, Agent, or Firm—David S. Safran (57) ABSTRACT

A drive arrangement for a motor vehicle door or hatch which can be moved by a motor with a planet gear and a brake device with a brake. The brake device has a brake drive which is separate from the drive which drives the drive shaft and the brake is able to be moved at least from one of two positions into the other of the two positions by the brake drive. The brake can be an arc-shaped clip pivotally supported by a pivot axle with an inner periphery which is matched to an outer periphery of an element of the planet gear. The brake can be combined with the brake drive as an eddy current brake or can be operated by a further gearing or use of a permanent magnet with which an electromagnet is able to interact.

33 Claims, 8 Drawing Sheets

DRIVE ARRANGEMENT FOR A MOTOR VEHICLE DOOR OR HATCH WHICH CAN BE MOVED BY A MOTOR

BACKGROUND OF THE INVENTION

1. Field of Invention

This invention relates to a drive arrangement for a motor vehicle door or hatch which can be moved by a motor with a planet gear and a brake device with a brake, the planet gear having a drive shaft, a driven shaft, a sun wheel, a planet carrier with planet wheels and a ring gear, the drive shaft being able to be driven by the motor and the driven shaft being coupled to the motor vehicle door or hatch. One of the elements which include the sun wheel, planet carrier and ring gear being coupled to the drive shaft, a second of the elements which include the sun wheel, planet carrier and ring gear being coupled to the driven shaft and the third of the elements which include the sun wheel, planet carrier and ring gear being able to be braked or blocked by means of the brake. The third of the elements which include the sun wheel, planet carrier and ring gear is not braked or blocked in the first position of the brake—released position—and in this position, the motor vehicle door or hatch is movable by hand, unhindered by the drive arrangement and the third of the elements which include the sun wheel, planet carrier and ring gear being braked or blocked in the second position of the brake—braking position—and thus, the drive shaft is coupled to the driven shaft so that, in this position, the motor vehicle door or hatch is able to be moved by a motor. The brake device has a brake drive which is separate from the drive which drives the drive shaft and the brake being able to be moved at least from one of the two positions into the other of the two positions by means of the brake drive.

The expression "motor vehicle door" should be understood here to be not only the side door of a motor vehicle, but also a sliding door or the like of a motor vehicle. The term "motor vehicle hatch" is defined as a rear hatch, trunk lid, optionally also the hood, etc.

2. Description of Related Art

The prior art discloses a motor vehicle lock (DE 199 35 589 A1) in which a planet gear is used as the gearing for driving an actuating lever which is coupled to a ratchet. The planet gear in this respect is part of an opening aid. The planet gear is made such that the actuating lever can be driven by two different actuating elements, specifically a normal actuating element and an emergency actuating element. The different actuating elements are used for force transmission which is matched to the respective purpose. The planet gear enables the respective actuation by the drive to be operated with a direction of rotation which differs in each case. The planet gear yields a compact construction.

Furthermore, the prior art discloses a drive device (International Application publication WO 00/36259 A1 which corresponds to U.S. Pat. No. 6,142,551) which is used to actuate a motor vehicle hatch by motor, therefore to open and close it. To do this, on each side of the motor vehicle hatch there is a respective motor with a gearing assigned to the motor, with which the motor vehicle hatch can be actuated. In order to also enable manual actuation of the motor vehicle hatch, the motor and gearing are made such that the motor is not blocked, but concomitantly turned when the motor vehicle hatch is manually actuated.

Conversely, another known drive device (published German Patent Application DE 40 41 480 A1) allows manual and motorized actuation of functional parts, especially of a motor vehicle door or hatch, without the motor being concomitantly moved when the motor vehicle door or hatch is manually actuated. There is a planet gear with a ring gear that can be driven by a motor. The driven shaft of the planet gear which is coupled to the motor vehicle door or hatch is rigidly coupled to the planet carrier. Moreover, there is a brake device which blocks the sun wheel during the motorized actuation of the ring gear so that the motion of the ring gear is transferred to the planet wheels, and thus, to the planet carrier so that, ultimately, the motor vehicle door or hatch is actuated.

For manual actuation of the motor vehicle door or hatch the sun wheel is driven by means of a crank arm. The ring gear is blocked in doing so by the coupling to the motorized drive which is designed to be self-locking, so that the torque of the sun wheel is transferred to the planet carrier, and thus, to the driven shaft. If, with the drive motor stationary, the motor vehicle door or hatch itself is moved by hand, this motion is also possible because, then, the crank arm is simply entrained as it turns backwards.

The brake device is actuated in the above described drive device by the same drive which also drives the ring gear. For this reason, rapid decoupling between the drive shaft and the driven shaft in an emergency, for example, when a hand is pinched in a sliding door, is not possible. First of all, the drive must be brought completely to rest before the action of the force on the drive shaft is stopped and manual or motorized actuation of the functional part in the opposite direction is possible. Moreover, the braking action in this configuration of the drive device is not optimum.

Another known drive device (German Patent Application DE 101 17 934 A1 and corresponding to U.S. Patent Application Publication 2004/0097318 A1), upon which the present invention is based, is used for motorized actuation of the rear hatch of a motor vehicle. The drive device has a motor and a planet gear which is assigned to the motor. The driven shaft of the planet gear is coupled to the rear hatch. In order to be able to ensure easy manual actuation in addition to motorized actuation, the planet gear is also used here as a clutch. For this reason, there is a brake device which allows braking of the ring gear for motorized actuation and which allows release of the ring gear for manual actuation. The brake device has a brake and a brake drive, the brake being adjustable by means of the brake drive between a braking position and a released position. To move the brake into the braking position, the brake is moved towards the ring gear until it engages the ring gear, positively or nonpositively, and accordingly, brakes or blocks it.

The disadvantage in the known braking arrangement with the described braking concept is the fact that the braking action can only be ensured especially for heavy rear hatches when the brake drive is made accordingly strong. This leads to high demands for installation space and to high costs.

It should be pointed out that there are also similar drive arrangements for use in sliding doors (U.S. Pat. Nos. 6,125, 586 and 6,460,295). In these drive arrangements, there is a braking device which allows braking of the sun wheel to implement the clutch action.

SUMMARY OF THE INVENTION

A primary object of the present invention is to develop the known drive device such that a high braking action can be accomplished with comparatively little effort.

This object is achieved, first of all, by a drive arrangement of the initially mentioned type wherein the brake is pivotally supported on one end by a pivot axle and the brake has an arc-shaped clip with an inside periphery which is matched to the outer periphery of the third of the elements which include the sun wheel, planet carrier and ring gear, preferably to the periphery of the ring gear.

First of all, it is provided that actuation of the braking device is ensured independently of the actual drive of the motor vehicle door or hatch. In this way, it is possible to decouple the drive shaft from the driven shaft even with the drive of the motor vehicle door or hatch running, and thus, to be able to react quickly to emergencies. This is accomplished by the braking device having a brake drive which is separate from the drive which drives the drive shaft.

The drive arrangement is made such that the drive shaft is coupled to one of the elements which include the sun wheel, the planet carrier, and the ring gear of a planet gear. A second of the elements which include the sun wheel, the planet carrier, and the ring gear is coupled to the driven shaft. The brake of the drive device is moved from the first position—released position—in which the third of the elements which include the sun wheel, the planet carrier, and the ring gear is not braked or blocked, and in this position, the motor vehicle door or hatch, adjustable by hand, can be moved unhindered by the drive device into the second position of the brake—braking position, in which the third of the elements which include the sun wheel, the planet carrier, and the ring gear is braked or blocked, so that the motor vehicle door or hatch can be moved by a motor in this position.

What is important is the finding that the configuration of the brake with an arc-shaped clip which is pivotally supported on one end by means of a pivot axle effects optimum use of the drive force which is applied by the brake drive. It is optimum when the brake drive acts on the free end of the circular clip and to a certain extent pulls the clip around the element which is to be braked. Here it can be advantageous if the arc-shaped clip is made slightly elastic in any case.

According to another independent teaching the brake and the brake drive are made jointly as an eddy current brake, it is proposed that the brake and brake drive be made jointly as an eddy current brake. This execution is advantageous in that frictional or positive engagement is not necessary for braking.

According to another teaching, which likewise has independent importance, the brake device, especially the brake, is coupled via further gearing to the third of the elements which include the sun wheel, the planet carrier, and the ring gear for its braking or blocking. A suitable design of the gearing thus makes it possible to keep the drive force which must be applied for adequate braking action by the brake drive relatively small.

Finally, according to the another independent teaching, a drive arrangement with a brake device is proposed with a brake drive which has a permanent magnet in combination with an electromagnet. The magnetic field which is generated by the permanent magnet causes a force to act on the brake in the direction of the braking position. The brake is to a certain extent magnetically pre-tensioned by this magnetic field in the direction of the braking position.

It is important to this further teaching that, depending on the polarity of the electromagnet, the magnetic field which has been generated by the permanent magnet can be intensified or weakened by means of the electromagnet. In this way, with a comparatively weak design of the electromagnet, a high force acting on the brake in the direction of the braking position—braking force—can be produced.

In a preferred configuration, the magnetic field generated by the permanent magnet is used to keep the brake in the braking position when the electromagnet has been turned off, in this state the braking force being reduced accordingly.

This can be advantageous for temporarily fixing the rear hatch or the like in the opened position or in an intermediate position without needing to trigger the electromagnet. Furthermore, this version offers additional safety when, for example, during motorized actuation of the rear hatch, the voltage supply fails. Then, the magnetic field generated by the permanent magnet ensures that unexpected slamming of the rear hatch shut is prevented. With the corresponding design, in this case, the braking force is reduced such that manual actuation is also still possible.

It is pointed out that weakening or intensification of the magnetic field here means the weakening or intensification of the magnetic field strength.

Other details, features, objectives and advantages of this invention are explained below using the drawings which show preferred embodiments of the invention.

BRIEF DESCRIPTION OF HE DRAWINGS

FIG. 7b is an enlarged view of the encircled detail of FIG. 7a, and FIGS. 8a & 8b are sectional views of the brake device of the drive device taken along line VIII-VIII of FIG. 5 in the braking position and in the released position, respectively.

DETAILED DESCRIPTION OF THE INVENTION

In the figures of the drawings the same reference numbers are used for the same or similar parts of the various embodiments. This is intended to indicate that the corresponding or comparable properties and advantages are achieved even if a repeated description of these parts is omitted.

Figure 1:
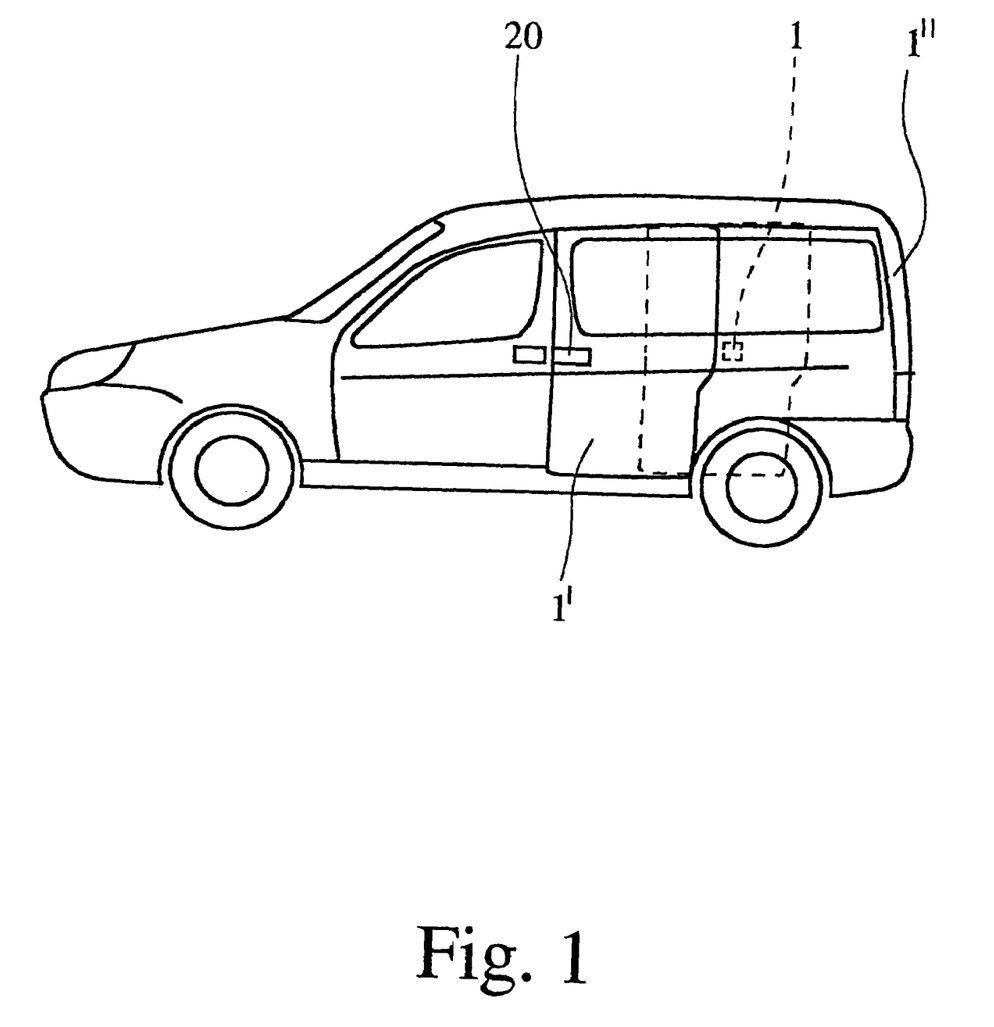
FIG. 1 is a schematic side view of a motor vehicle with a side door, a sliding door and a rear hatch and with a drive arrangement in accordance with the invention for the sliding door.

FIG. 1 shows a drive device 1 for a motor vehicle door 1' or motor vehicle hatch 1" which can be moved by a motor. The motor vehicle door 1' is especially a sliding door, the motor vehicle hatch is especially a rear hatch 1" or trunk lid.

The motor vehicle door 1 or hatch can be actuated, i.e., it can be opened and closed, by means of the drive device 1 both by motor and also manually.

Figure 2:
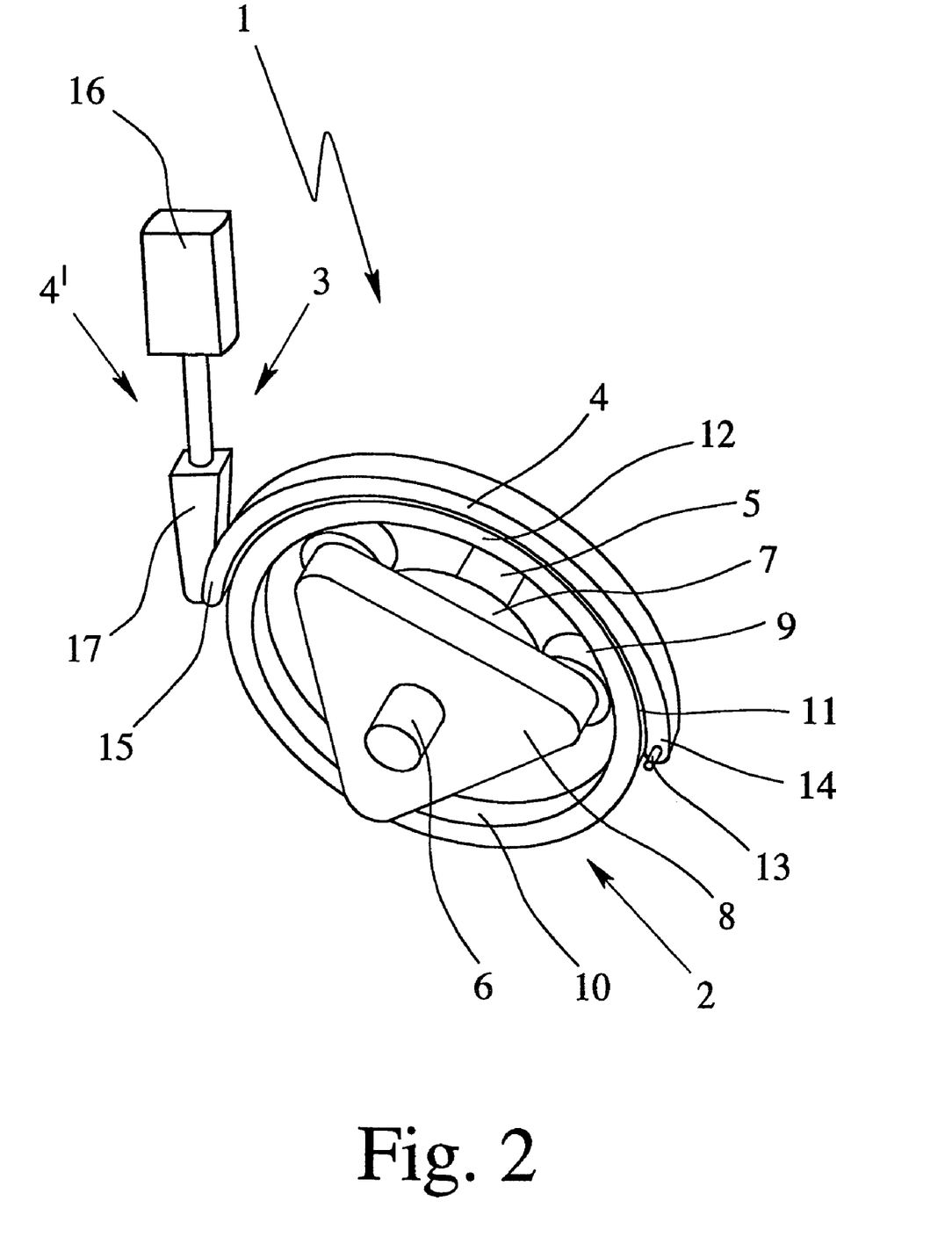
FIG. 2 is a schematic perspective view of the drive arrangement in accordance with the invention.

The drive device 1, as shown in FIG. 2, has a planet gear 2 and a brake device 3 with a brake 4. The planet gear 2 has a drive shaft 5, a driven shaft 6, a sun wheel 7, a planet carrier 8 with planet wheels 9, and a ring gear 10.

Figure 7:
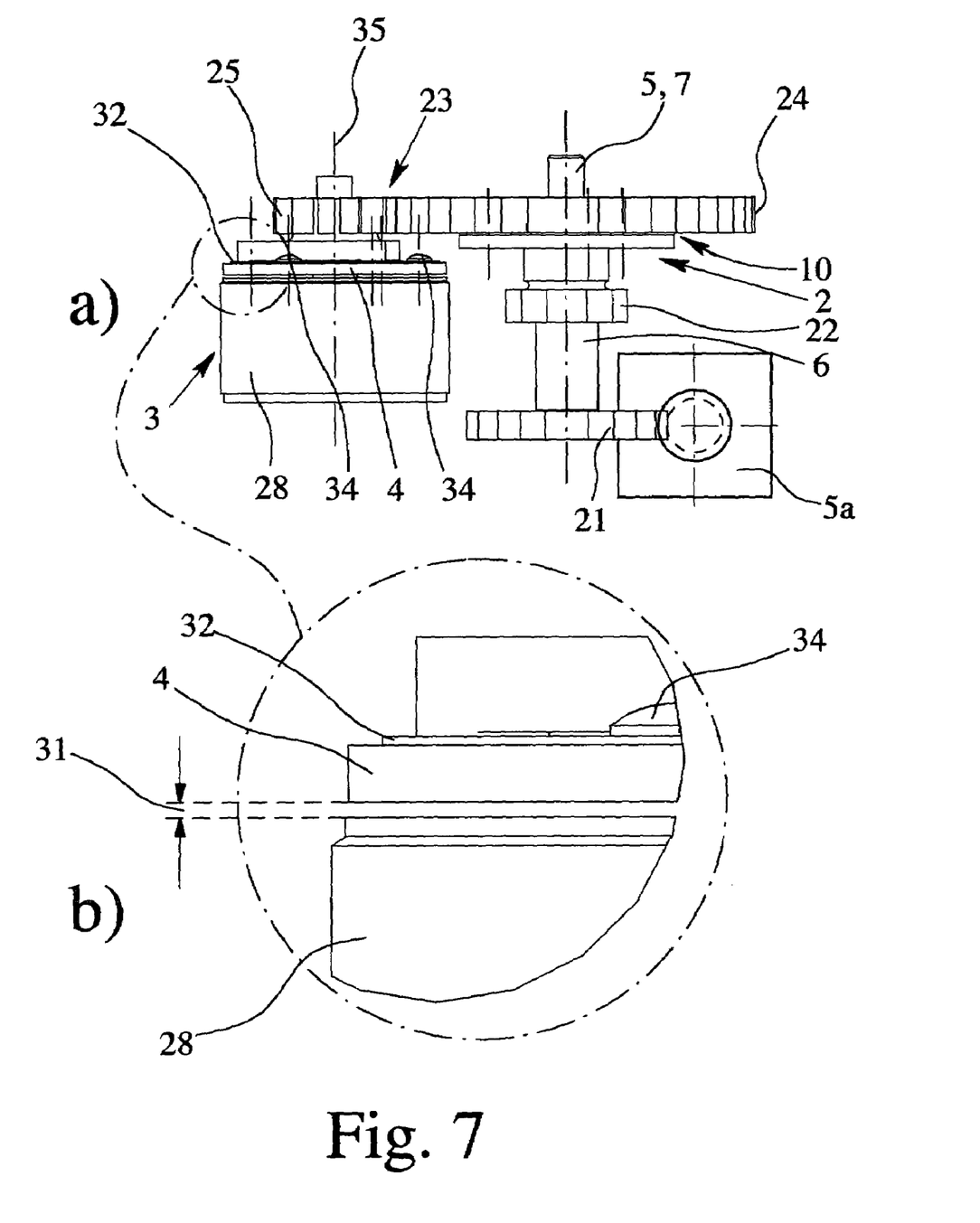

The drive shaft 5 can be driven by motor by a drive 5a which is shown as an example for another embodiment in FIG. 7. The drive can be made as an electric motor, as a pneumatic drive, as a hydraulic drive or the like.

The driven shaft 6 is coupled to the motor vehicle door 1' or hatch indirectly, i.e., by interposition of other elements, such as levers, Bowden cables, gear wheels, etc., or directly, i.e., without the interposition of other elements. When the driven shaft 6 is driven, the motor vehicle door 1' or hatch is actuated at the same time by the drive coupling, or vice versa, when the motor vehicle door 1' or hatch is moved by hand, the driven shaft 6 is also moved.

FIG. 2 shows the drive device 1 with the brake device 3 in the released position. When the brake device 3 is in the released position, the drive shaft 5 and the driven shaft 6 are not coupled to one another. Even when the drive shaft 5 is driven, this motion is not transferred to the driven shaft 6. Conversely, however, motion of the driven shaft 6 is not transferred to the drive shaft 5 or blocked by it either. In order to transfer motion between the drive shaft 5 and the driven shaft 6, it is necessary to couple the drive shaft 5 to the driven shaft 6.

The drive shaft 5 is coupled to one of the elements which include the sun wheel 7, the planet carrier 8, and the ring gear 10 of a planet gear 2, here preferably to the sun wheel 7. The driven shaft 6 is coupled to a second of the elements which include the sun wheel 7, the planet carrier 8, and the ring gear 10, here preferably to the planet carrier 8. When the brake device 3 is in the released position, the third of the of the elements which include the sun wheel 7, the planet carrier 8, and the ring gear 10, here preferably the ring gear 10, can turn freely. In order to couple the drive shaft 5 to the driven shaft 6, the ring gear 10 can be blocked by means of the brake 4 of the brake device 3. The ring gear 10 of the planet gear 2, then, can no longer turn. In this way, coupling between the drive shaft 5 and the driven shaft 6 is achieved, as is explained in detail below.

To brake or block the third of the elements which include the sun wheel 7, the planet carrier 8, and the ring gear 10, the brake device 3 has a brake drive 4' which is separate from the drive which drives the drive shaft 5 for the brake 4. The brake 4 can then be moved by means of the brake drive 4' at least from one of the two positions—released position, braking position—into the other of the two positions.

Figure 3:
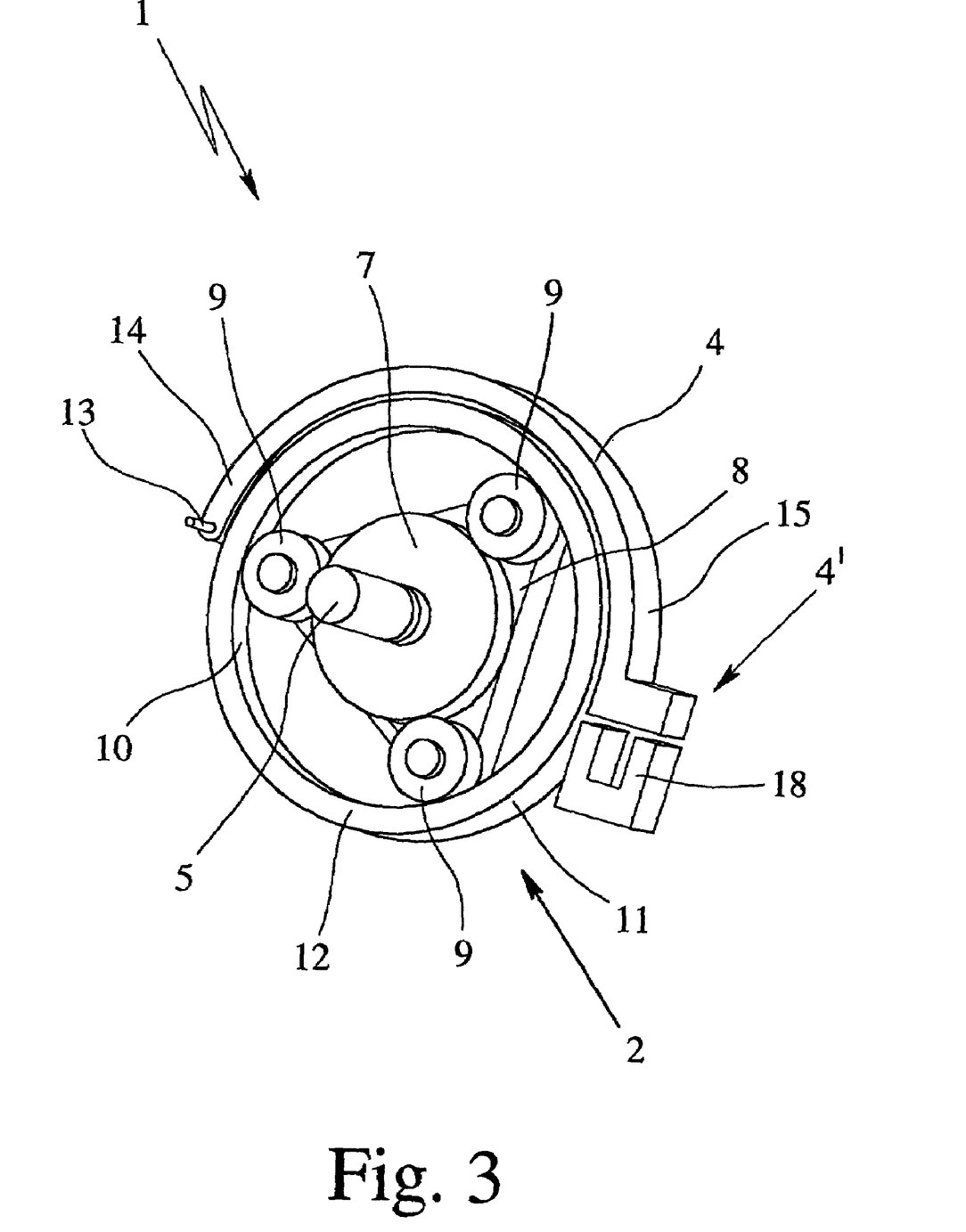
FIG. 3 shows a schematic perspective view of a second drive device in accordance with the invention.

In the embodiment shown in FIGS. 2, 3, the brake 4 is pivotally supported by a pivot axle 13 on one end 14. The brake 4 is an arc-shaped clip with an inner periphery which is matched to the outer periphery of the ring gear 4'. On the second end 15 of the brake 4 is the brake drive 4'. FIG. 2 shows the released position of the brake 4 with a gap between the brake 4 and the ring gear 10. The brake 4 can be moved by the brake drive 4' into the braking position. The arc-shaped clip is pressed down here onto the outer periphery of the ring gear 10 as the gap is overcome.

Therefore, the brake 4 is moved down by the brake drive 4' in FIG. 2 and is pressed against the outer jacket surface 11 of the ring gear 10. The brake 4, here, is preferably made and arranged such that it engages the outer jacket surface 11 of the ring gear 10 with an area that is as large as possible.

Figure 4:
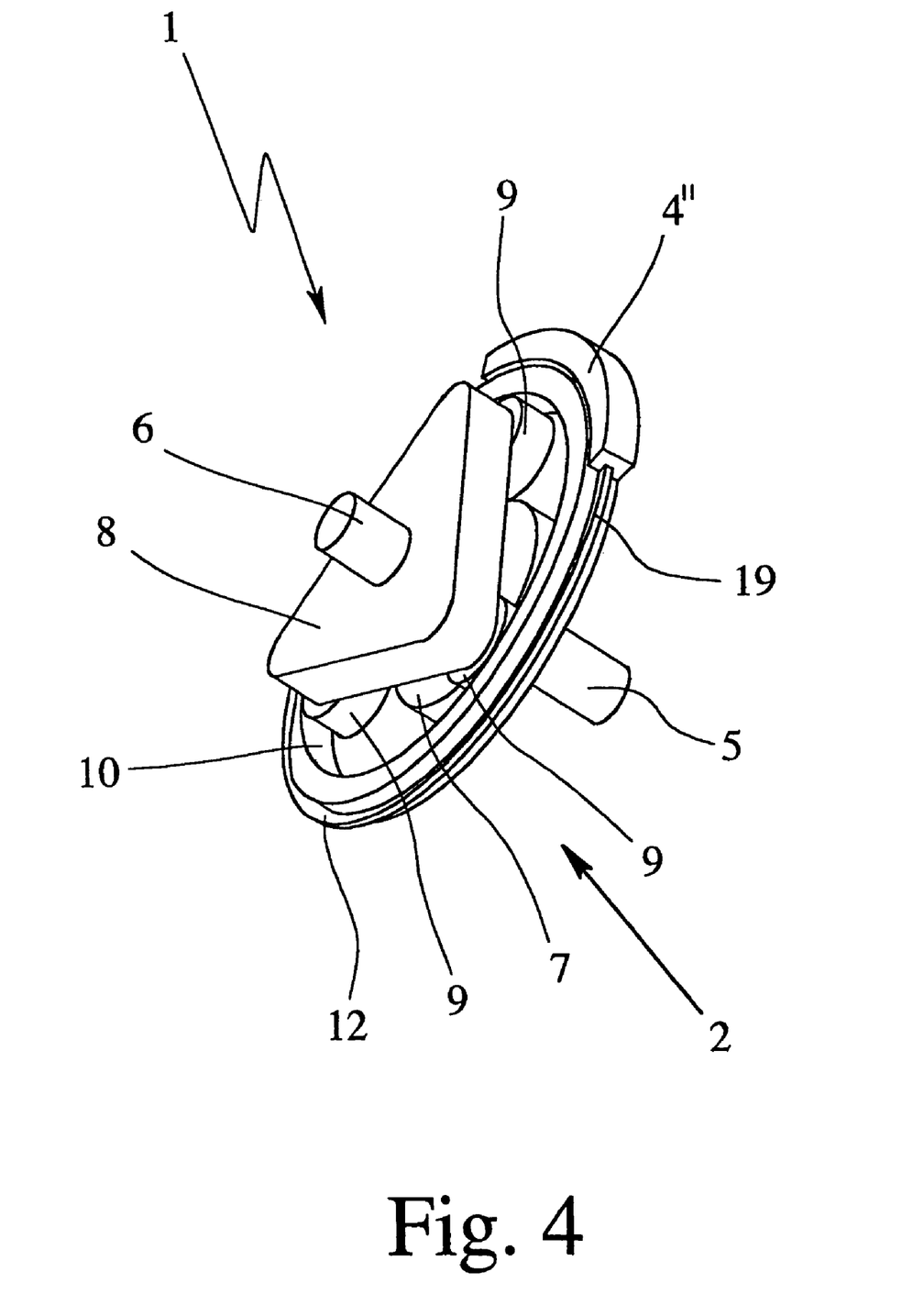
FIG. 4 shows a schematic perspective view of a third drive device in accordance with the invention.

The arrangement shown in FIG. 4, according to another independent teaching, is a version with an eddy current brake having a magnet 4". This is especially advantageous when space conditions do not allow a projecting brake device 3.

Here, the ring gear 10 preferably has a strip 19. The brake 4 is arranged around the strip 19 so that the action of the force, and thus, also the braking action, can act on the strip 19 from both sides. The strip 19 can also be used advantageously here, in addition, in the manner of the rotating disk of a classical disk brake.

In the embodiments shown in FIGS. 2 & 3, the brake 4 can be moved from the released position into the braking position by means of the brake drive 4' and from the braking position back into the released position by a spring force. When the brake 4 is held in the braking position by positive locking and/or by continuing operation of the brake drive 4', it is not necessary to reverse the motion of the brake drive 4' to reset the brake 4 into the released position.

Alternatively, the drive device 1 can be made such that the brake 4 can be moved from the released position into the braking position and from the braking position into the released position by means of the brake drive 4'. In doing so, the drive device 1 can also be made such that either the released position is the rest position of the brake 4, or that the braking position is the rest position of the brake 4. However, the version in which the braking position is the rest position of the brake 4 is unfavorable in that manual actuation of the motor vehicle door 1' or hatch is only possible when the brake drive 4' has been connected beforehand. However, manual actuation should also be possible when the drive device 1 can no longer be supplied with energy.

Another alternative is that the brake 4 can be moved from the braking position, which is again the normal position in this alternative, into the released position by means of the brake drive 4' and from the released position into the braking position under a spring force, so that the reversal of motion for the brake drive 4' is in turn unnecessary. In this embodiment, the brake 4 is preferably kept in the released position by positive locking and/or by the brake drive 4'. However, similar problems to those explained above occur.

The third of the elements which include the sun wheel 7, the planet carrier 8, and the ring gear 10 has an outer jacket surface 11 which is made here as a brake lining in order to achieve a braking action that is as good as possible. Instead of this, the outer jacket surface 11 of the third of the elements which include the sun wheel 7, the planet carrier 8, and the ring gear 10 can also have an additional brake lining. Moreover, depending on the execution of the brake device 3, a side surface 12 of the third of the elements which include the sun wheel 7, the planet carrier 8, and the ring gear 10 can be made as a brake lining or can have an additional brake lining. However, here, it is not necessary for the entire side surface 12 to be made as a brake lining or to have the additional brake lining, but it can be sufficient for part of the side surface 12 to be made as a brake lining or to have a brake lining which engages the brake 4 in the braking process. Here, the brake lining is located on the ring gear 10. The arrangement of the brake lining on the ring gear 10 has the special advantage that, from itself, the greatest possible area is available.

The sun wheel 7, as the first of the elements which include the sun wheel 7, the planet carrier 8, and the ring gear 10, is preferably rigidly coupled to the drive shaft 5 so that the sun wheel 7 is driven together with the drive shaft 5. Driving takes place preferably by an electrical motor in conjunction with gearing. The gearing is preferably made as a worm gear and is self-locking.

Here, the driven shaft 6, by which the motor vehicle door 1' or hatch is actuated by a motor, is rigidly coupled to the planet carrier 8 as the second of the elements which include the sun wheel 7, the planet carrier 8, and the ring gear 10. The rigid coupling of the drive shaft 5 to the sun wheel 7 and the driven shaft 6 to the planet carrier 8 ensures a suitable reduction ratio between the drive and the motor vehicle door 1' or hatch. If a different transmission ratio is necessary, the drive shaft 5 and the driven shaft 6 can also be coupled differently.

The actuation of the motor vehicle door 1' or hatch can take place manually, by elements which are not shown here, when the brake device 3 is in the released position. In any case, actuation is not adversely affected by the planet gear 2 or the drive of the drive shaft 5, since the drive shaft 5 is decoupled from the driven shaft 6. With manual actuation of the motor vehicle door 1' or hatch, the driven shaft 6 is turned, but the latter transfers the motion to the ring gear 10, which is not blocked in this position, since the drive shaft 5, by coupling to the drive, offers greater resistance to movement than the ring gear 10. The drive shaft 5 thus remains stationary in its position.

For motorized actuation, the ring gear 10 is blocked by the brake 4 of the brake device 3. The sun wheel 7, which is driven by the drive shaft 5, shifts the planet wheels 9 into rotary motion. The planet wheels 9 roll on the inside of the ring gear 10, and in doing so, turn the planet carrier 8 and the driven shaft 6 at the same time. The motion of the driven shaft 6 is then transferred directly or indirectly to the motor vehicle door 1' or hatch.

The configuration of the brake 4 as a frictionally engaged brake is especially preferred. In the embodiment shown in FIG. 2, the brake 4 of the brake device 3 is made as a shoe brake which can be moved into frictional engagement with the ring gear 10, at least in sections. A shoe brake here is a brake which is pressed from the outside or from the inside against a surface, here the ring gear 10. However, the brake 4 can also be made as a disk brake. A disk brake is conversely a brake which is not pressed flat against an opposing surface, but which grips a disk on either side and squeezes it between two brake linings.

In another preferred configuration, the brake 4 is made as a positive engagement brake or as a positive-frictional engagement brake, the brake 4 for this reason having preferably corresponding teeth or the like.

The brake device 3, depending on the execution and control of the drive device 1, can be made with or without self locking. In the version with self-locking, the brake 4 must be engaged to the ring gear 10 by a motor for the braking process, then the brake drive 4' can be turned off. The brake 4 is kept in the braking position by the brake drive 4' in this case (compare details above) so that the brake 4 remains engaged with the ring gear 10 and so that the latter is braked or blocked. In the version of the brake device 3 without self-locking and without positive engagement, it is conversely necessary for the brake drive 4' to remain on during the entire braking process and for the brake 4 to thus be held in the braking position. This embodiment, in terms of safety engineering, offers the advantage that decoupling from the drive shaft 5 and driven shaft 6 is possible more quickly, since it is enough to simply turn off the brake drive 4' of the brake 4. In the embodiment with self-locking, on the other hand, the brake 4 must be first moved actively by the brake drive 4' back into its released position. In the version with positive engagement the brake 4 must be unlocked.

The brake drive 4' of the brake 4 here (FIG. 2) has an electric motor 16 and gearing 17 which is made as a worm gear. The brake 4 can be caused to engage the ring gear 10 by means of the electric motor 16. This takes place in that the brake 4 is pivoted by the electric motor 16 out of the released position around the pivot axle 13 into the braking position and then rests frictionally engaged against the outside jacket surface 11 of the ring gear 10. The gearing 17 here is preferably located on the second end 15 of the brake 4.

As explained above, it is possible to make and control the brake device 3 such that the brake drive 4', here especially the electric motor 16, is driven only until the brake 4 reaches the brake position, especially until the brake 4 and the ring gear 10 engage. Due to the self-locking of the brake device 3, the brake 4 remains engaged to the ring gear 10. The same applies analogously to the movement of the brake 4 into the released position.

However, it is also possible to make and control the brake device 3 such that the brake drive 4', here especially the electric motor 16, is driven during the entire braking process and/or during the entire releasing process. Self-locking of the brake device 3 is then not necessary. After the brake drive 4' is turned off, the brake 4 is moved back again into its released position. This generally takes place by spring force.

FIG. 3 shows another embodiment of the drive device 1. The brake drive 4' of the brake 4 is made here as a solenoid 18 for moving the brake 4 out of the released position into the braking position. The brake 4 is, in turn, made as before as a shoe brake which can be caused to engage the inner jacket surface 11 of the ring gear 10. The brake device 3 can also be made here, again, with or without self-locking. Otherwise the drive device 1 has the same features and advantages as were described above.

FIGS. 5 to 8 show an embodiment according to another independent teaching. Here, the planet gear 2 is engaged to the brake device 3 in an quite special way, as will be explained.

Figure 5:
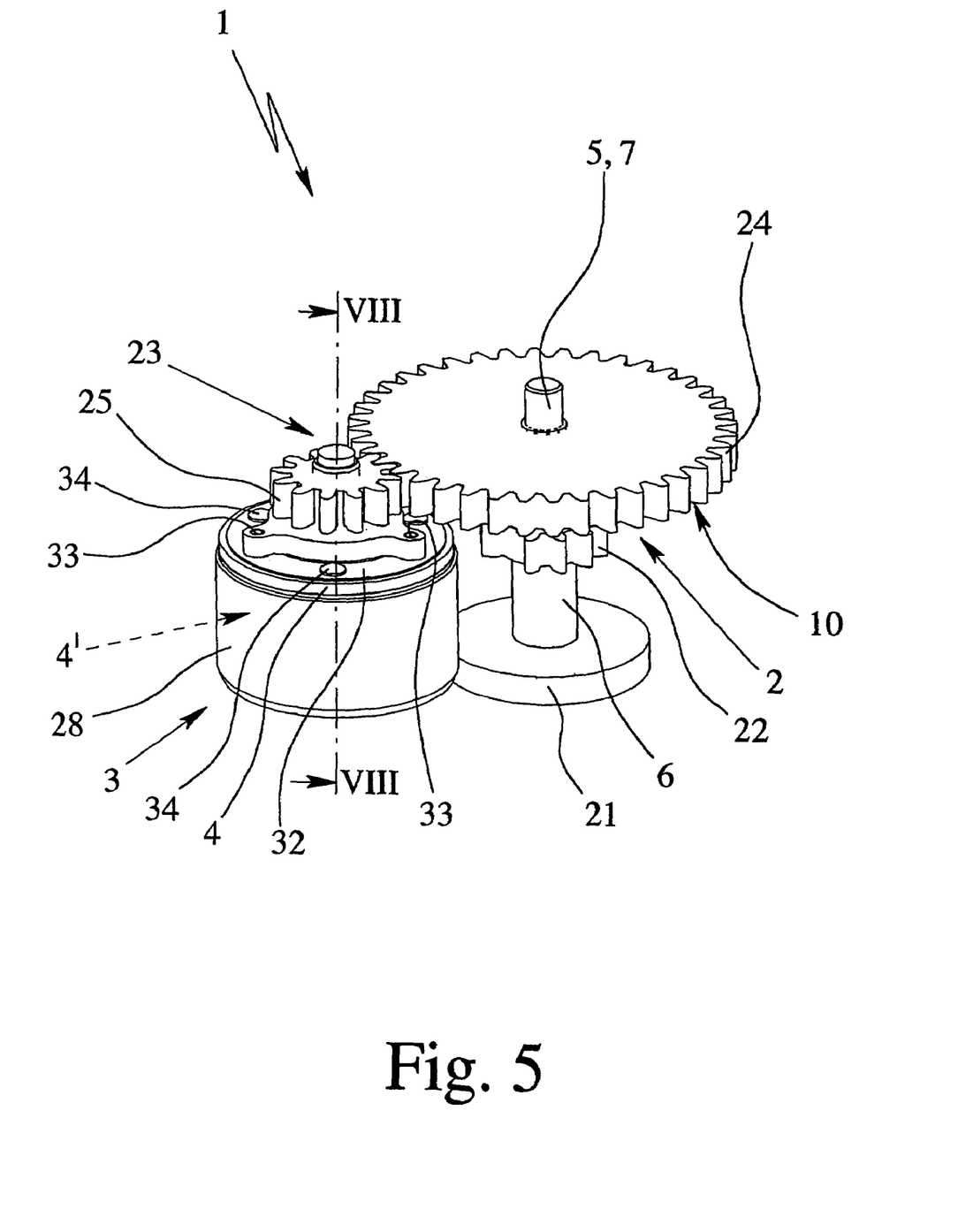
FIG. 5 shows a schematic perspective view of a fourth drive device in accordance with the invention.

In the embodiment shown in FIG. 5, the sun wheel 7 of the planet gear 2 is coupled or connected to the drive shaft 5 (see, FIGS. 2 & 3 for the arrangement of the planetary gear 2 and the parts thereof). For the implementation of a worm wheel drive, the drive shaft 5 is accordingly equipped with a worm wheel 21 which meshes with the worm of a drive motor 5a (FIG. 7). The driven shaft 6, in this embodiment, is coupled or connected to the planet carrier 8. The driven shaft 6 here is made as a hollow shaft and is penetrated by the drive shaft 5. For coupling of the driven shaft 6 to an actuating element (not shown), the driven shaft 6 is equipped with a gear wheel 22. The ring gear 10 holds the planet carrier 8 with the assigned planet wheels 9, as is shown in FIGS. 2 to 4. The ring gear 10, in this embodiment, forms the third of the elements which include the sun wheel 7, the planet carrier 8, and the ring gear 10 in the aforementioned sense and is therefore made able to be braked. However, depending on the application, it can also be advantageous, as described above, to make the sun wheel 7 or the planet carrier 8 able to be braked. For braking or blocking of the ring gear 10, the brake 4 is coupled via further gearing 23 to the ring gear 10.

For the configuration of the further gearing 23, a series of possibilities is conceivable. One especially simple implementation arises in the configuration of the further gearing 23 as a spur gear. For this reason, the ring gear 10 has external teeth 24 which engage an assigned gear wheel element 25 of the brake device 3. However, the further gearing 23 can also be a planet gear, toothed belt, gear chain, or the like.

Figure 6:
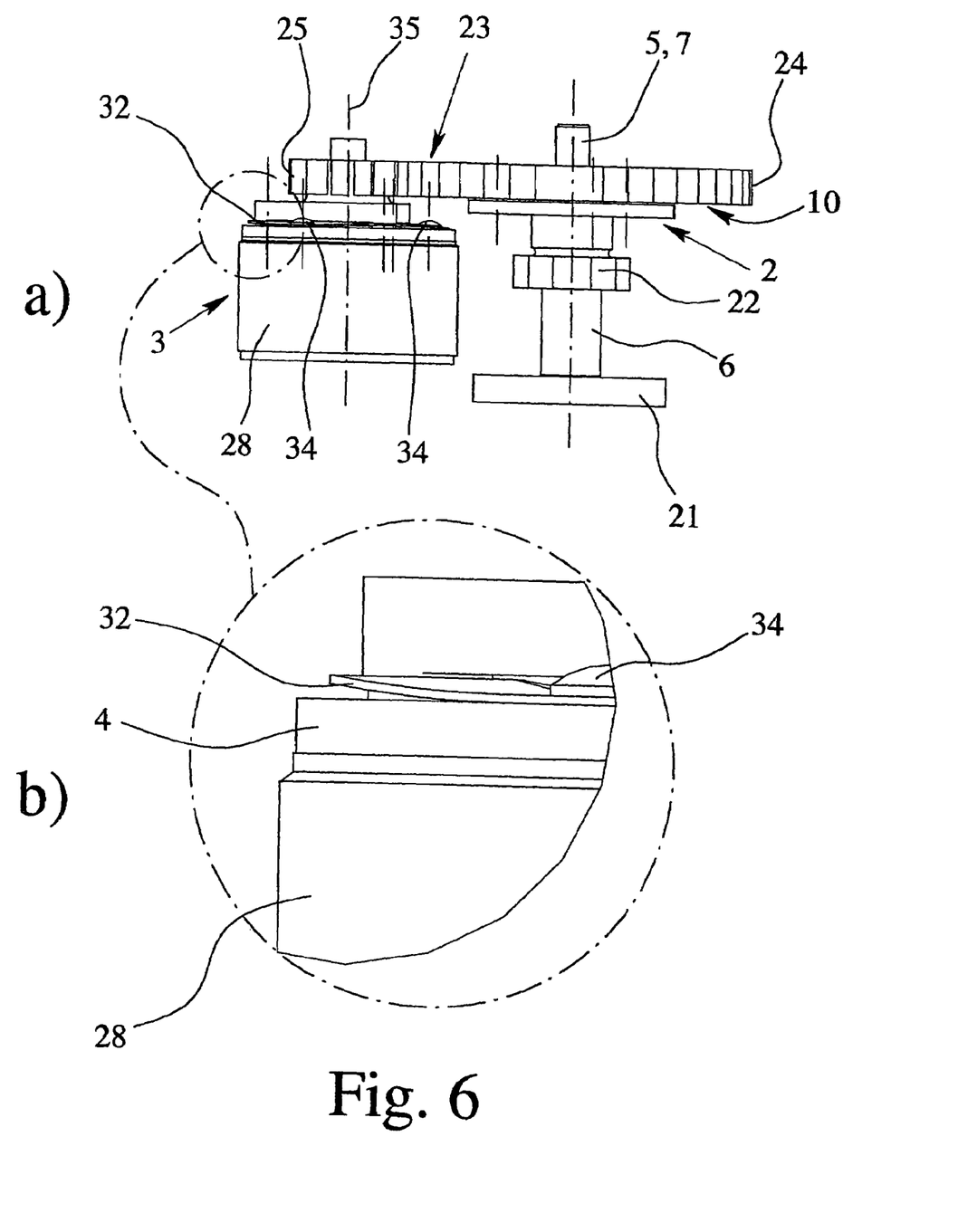
FIG. 6a is a side view of the drive device as shown in FIG. 5 when the brake is in the braking position in a first side view and FIG. 6b is an enlarged view of the encircled detail of FIG. 6a, FIG. 7a is a side view showing the drive device of FIG. 5 when the brake is in the released position

By the corresponding design of the further gearing 23, the force which must be applied for braking or blocking of the ring gear 10 by the brake device 3 can be largely optionally reduced; this is advantageous for the design of the brake drive 4'. Accordingly, FIGS. 5 to 7 show the configuration of the further gearing 23 as speed-reduction gearing.

The above described coupling of the brake 4 to the third of the elements which include the sun wheel 7, the planet carrier 8, and the ring gear 10 via the further gearing 23 can be applied fundamentally to all types of brake devices 3. The drive device 1 shown in FIG. 5 shows a quite especially advantageous configuration of the brake device 3. This drive device 1 is also the subject of an independent teaching with respect to the configuration of the brake device 3.

Figure 8:
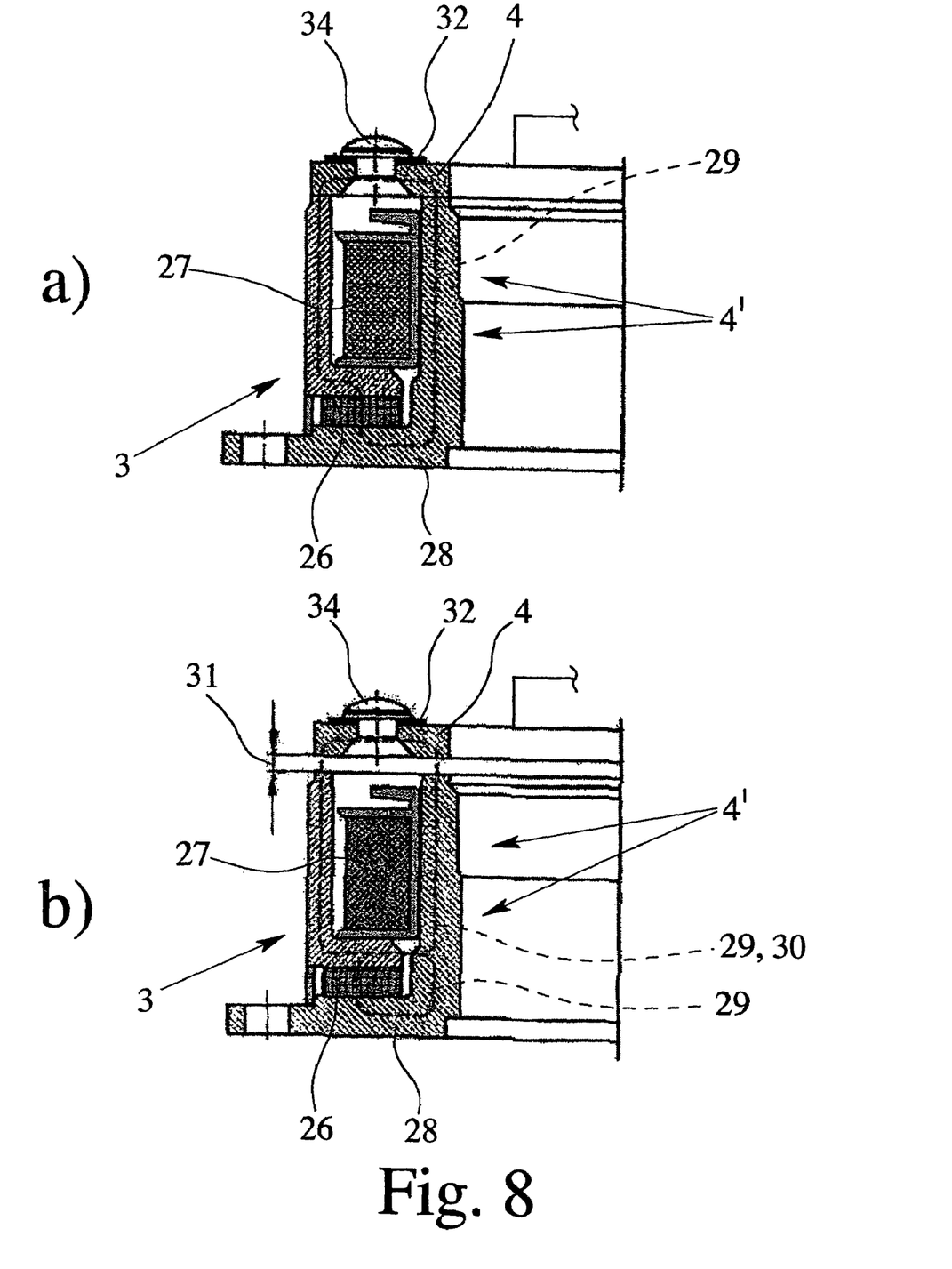

It is important to the configuration of the brake device 3 which is shown in FIG. 5 that the brake drive 4' has a permanent magnet 26 (shown in FIG. 8) which generates a magnetic field, the magnetic field generated by the permanent magnet 26 causing a force to act on the brake 4 in the direction of the braking position in a manner still to be explained. Furthermore, the brake drive 4' has an electromagnet 27, the triggering of which likewise produces a magnetic field. The arrangement is made such that, depending on the polarity of the electromagnet 27, the magnetic field which is generated by the permanent magnet 26 can be weakened or intensified by means of the electromagnet 27.

The superposition of the magnetic field which is generated by the permanent magnet 26 with the magnetic field which is generated by the electromagnet 27 yields a resulting magnetic field which causes the resulting action of a force on the brake 4. The resulting magnetic field can be controlled by means of the electromagnet 27.

In an especially preferred configuration, the brake device 3 is assigned three different braking states. In the first braking state, the electromagnet 27 is not triggered, so that the brake 4 is in the braking position by the action of the magnetic field which has been generated by the permanent magnet 26 and exerts a first braking force. In a second braking state, the electromagnet 27 is triggered such that intensification of the braking force results. For this reason, it is necessary for the magnetic field which has been generated by the permanent magnet 26 to be aligned essentially to the magnetic field which is generated by the electromagnet 27 so that the magnetic field intensities are accordingly added to or subtracted from one another. In a third braking state, the electromagnet 27 is triggered such that the brake 4 is in the released position, therefore a braking force is not being applied.

"Triggering" of the electromagnet 27 means supplying the electromagnet 27 with a corresponding control voltage. The control voltage can be a DC voltage or can have a certain voltage characteristic. A pulsed control voltage or a single voltage pulse is also possible.

The arrangement is made such that, in the first braking state, the braking force is preferably roughly 50% of the maximum braking force and that, in the second braking state, the braking force is preferably roughly 100% of the maximum braking force.

The special advantage of the above described brake device 3 with three braking states is explained below using the application of the drive device 1 for the actuation of the rear hatch 1" of a motor vehicle.

In the motorized actuation of the rear hatch 1" of a motor vehicle, the driven shaft 6 of the planet gear 2 is coupled to the rear hatch 1" via the gear wheel 22 and further via an actuating element. For normal motorized actuation, the brake device 3 is in the second braking state, so that the braking force is preferably 100% of the maximum braking force. Accordingly, in the embodiment shown in FIG. 5, the ring gear 10 is braked with the maximum braking force so that the drive shaft 5 is coupled to the driven shaft 6.

For manual actuation of the rear hatch 1", the brake device 3 is transferred into the third braking state so that the brake 4 is in the released position and does not apply any braking force. Then, the flow of forces between the drive shaft 5 and the driven shaft 6 is interrupted and the rear hatch 1" can be manually actuated largely freely.

When the rear hatch 1" has been opened or when the rear hatch 1" is in the intermediate position, if an actuation process is not underway, the hatch must be fixed in its position. For this purpose, the brake device 3 is transferred into the first braking state in which the electromagnet 27 is not triggered. Then, the magnetic field which has been generated by the permanent magnet 26 causes a reduced braking force which is, however, sufficient to keep the rear hatch 1" in the respective position. Furthermore, in this first braking state, manual actuation is possible, even if with the corresponding application of a force. In this case, the brake device 3 works to a certain extent in the manner of a sliding clutch.

In the above described configuration of the brake device 3, it is especially advantageous that, in case of a power failure, for example, during motorized actuation of the rear hatch 1", it is ensured that the rear hatch 1" is fixed in the position which is the current one at the time. Furthermore, it is advantageous that in spite of fixing the rear hatch 1", manual actuation is possible, even if with the corresponding expenditure of force.

There is a series of possibilities for the configuration and arrangement of the permanent magnet 26 and of the electromagnet 27. The triggering of the electromagnet 27 can also be different depending on the application.

In the preferred embodiment shown in FIG. 5, in the second braking state, the triggering of the electromagnet 27 is the reverse of the triggering of the electromagnet 27 in the third braking state. Reversing the polarity of the electromagnet 27 here causes a weakening or intensification of the magnetic field which has been generated by the permanent magnet 26.

In the third braking state, it is such that the magnetic field which has been generated by the electromagnet 27 is directed opposite the magnetic field which has been generated by the permanent magnet 26 and essentially cancels it. This ensures that, in the third braking state, a braking force is not applied. Optionally, the brake 4 is pre-tensioned such that, by the elimination of the resulting magnetic field, the brake is moved into the released position. One preferred embodiment for implementation of this pre-tensioning is explained below.

FIG. 8a shows the brake device 3 of the drive device shown in FIG. 5 when the brake 4 is in the braking position and FIG. 8b the situation when the brake 4 is in the released position. In the illustrated preferred embodiment, the permanent magnet 26 is accommodated in a housing 28, the magnetic field which has been generated by the permanent magnet 26 at least partially penetrating the housing 28. The electromagnet 27 is also accommodated in the housing 28. The magnetic field which has been generated by the electromagnet 27 also at least partially penetrates the housing 28. In FIG. 8b, the field lines 29 of the magnetic field which has been generated by the permanent magnet 26 and the field lines 30 of the magnetic field which has been generated by the electromagnet 27 are shown roughly schematically. FIG. 8a shows the magnetic field 29 which has been generated solely by the permanent magnet 26 with the electromagnet 27 turned off (first braking state). FIG. 8b shows the weakening or cancellation of the magnetic field which has been generated by the permanent magnet 26 (third braking state).

To ensure the braking function, the brake 4 which is in the braking position is engaged to the housing 28 for braking or blocking of the third of the elements which include the sun wheel 7, the planet carrier 8 and the ring gear 10.

In order to ensure the adjustability of the brake 4 by means of a magnetic field, the brake 4 is at least in part magnetic or magnetizable, the magnetic field which has been generated by the permanent magnet 26 at least partially penetrating the brake 4 which is in the braking position.

The arrangement of the brake 4 with respect to the housing 28 acquires special importance at this point. In one especially preferred configuration, the magnetic field which has been generated by the permanent magnet 26 has an air gap 31 between the brake 4 and the housing 28 when the brake 4 is in the released position (FIG. 8b). When the brake 4 is in the braking position, this air gap 31 is closed (FIG. 8a). Therefore, the brake 4, to a certain extent, forms a yoke for the arrangement of the magnets 26, 27.

The more closely the brake 4 approaches the housing 28, the stronger the force produced by the magnetic field which has been generated by the permanent magnet 26 acting on the brake 4 in the direction of the braking position, therefore on the housing 28. The action of the force is in an inverse relationship to the width of the air gap. This relationship can be used for especially simple triggering of the electromagnet 27, as is shown below.

In one especially preferred embodiment, the brake device 3 has a spring element 32 which causes pre-tensioning of the brake 4 into the released position. This can be especially recognized in FIGS. 6b & 7b. The permanent magnet 26, on the one hand, and the spring element 32, on the other hand, are designed such that, when the brake 4 is in the braking position (FIG. 6), the force acting on the brake which has been generated by the permanent magnet 26 prevails over the force acting on the brake 4 which has been produced by the spring element 32. When the electromagnet 27 has been turned off, the braking position therefore constitutes a stable position for the brake 4.

Furthermore, the aforementioned design results in the force acting on the brake 4 which has been generated by the spring element 32 prevailing over the acting force which has been generated by the permanent magnet 26 when the brake 4 is in the released position (FIG. 7a). Thus, when the electromagnet 27 has been turned off, the released position for the brake 4 also constitutes the stable position. Therefore, for transfer of the braking device 3 from the first braking state into the third braking state, simply pulsed triggering of the electromagnet 27 over a certain time interval is necessary until the brake 4 snaps into the released position. With consideration of the relationship between the width of the air gap and the force acting on the brake 4 which was addressed above, a corresponding design can be easily determined.

For the configuration of the spring element 32, a series of possibilities are possible. One especially preferred configuration, which is shown in FIGS. 6, 7, calls for the spring element 32 to be made as a cup spring.

FIGS. 6 & 7 indicate that the brake 4 is otherwise suspended by way of the spring element 32 on the brake device 3. For this purpose the spring element 32 is connected via first attachment points 33 to the gear wheel element 25 and via second attachment points 34 to the brake 4. The first and second attachment points 33, 34 are offset over the periphery of the spring element 32 such that movement of the brake 4 from the released position into the braking position leads to elastic bending of the spring element 32.

The gear wheel element 25 is fixed accordingly in the direction of its axis of rotation 35. This becomes clear by comparison of FIGS. 6 & 7.

In the embodiment shown in FIGS. 6 & 7, the adjustment motion of the brake 4 between the released position (FIG. 7) and the braking position (FIG. 6) is a linear movement of roughly 0.6 mm. Depending on the configuration, there can be more or less movement here.

The housing 28 is made stationary in one preferred configuration, the brake 4 being dynamically coupled to the third of the elements which include the sun wheel 7, the planet carrier 8, and the ring gear 10. However, it can also be advantageous for the brake 4 to be located preferably directly on the third of the elements which include the sun wheel 7, the planet carrier 8, and the ring gear 10. One possibility is for the brake to be connected via the spring element 32 to the third of the elements which include the sun wheel 7, the planet carrier 8, and the ring gear 10.

However, it can also be provided for the housing 28 to be located on the third of the elements which include the sun wheel 7, the planet carrier 8, and the ring gear 10 or to be made integrally with this element, and accordingly, for the brake to be made stationary with respect to the motion of the third of the elements which include the sun wheel 7, the planet carrier 8, and the ring gear 10. Then, the electromagnet 27 is optionally coupled likewise stationary and magnetically via a gap to the housing 28.

One especially space-saving, and at the same time, effective arrangement is achieved by the permanent magnet 26 being made annular. However, it can also be provided that the desired magnetic field be produced by a plurality of individual permanent magnets 26. The electromagnet 27 is preferably made as a coil which is located concentrically to the permanent magnet 26. The housing 28 preferably has the shape of a drum.

For all the above described embodiments, as already explained individually, it is pointed out that the brake 4 can be made as a frictional engagement brake or as a positive engagement brake. In the frictional engagement brake 4, the brake 4 itself and the element which corresponds to the brake 4 are preferably provided with a corresponding brake lining. For the positive engagement brake 4, there are the corresponding interfitting structures. One example of this is providing the brake 4 with a toothed surface. By this positive engagement a high braking action can be achieved with little effort. When the brake 4 is equipped with a toothed surface, for a predetermined torque between the drive shaft 5 and the driven shaft 6, controlled "slipping through" of the brake 4 in the manner of an overload safeguard can be achieved.

In the embodiment shown in FIG. 5, proceeding from the first braking state, the aforementioned "slipping through" of the brake 4 would lead to transfer of the brake device 3 into the third braking state. Until the next triggering of the electromagnet 27, the brake 4 remains in the released position, which, as described above, constitutes a stable position for the brake 4. This automatic quality can be feasible especially with respect to the manual actuation capacity.

The drive device 1 here preferably has an actuation element 20, especially a door handle. It is made such that the brake 4, when the actuating element 20 is actuated, is moved into its released position. The actuation of the actuating element 20 is used in this respect as an indication of the presence of an emergency, so that the drive shaft 5 and the driven shaft 6 are decoupled. The execution of the door handle as such an actuating element 20 is especially advantageous in this respect since actuation of the door handle is a normal reaction in an emergency, for example, when something is pinched in the motor vehicle door 1'.

The actuating element 20 on the motor vehicle door 1' can also be a door handle which simply turns on the drive of the motor vehicle door 1' with a first, gentle actuation. Guided by a control then the brake device 3 is also turned on. Only additional or more vigorous actuation of the door handle can then be used to turn off the brake device 3 and thus to decouple the motor vehicle door 1' from the drive.

Finally, it should be pointed out that all the aforementioned drive devices 1 are suitable for a host of applications. Use for motorized actuation of a sliding door 1' or of the rear hatch 1" or of the trunk lid of a motor vehicle is especially advantageous.

In the motorized actuation of the rear hatch 1" or of the trunk lid of a motor vehicle, the driven shaft 6 of the planet gear 2 is preferably coupled to an actuating element which transfers the actuating motion via a push rod or the like to the rear hatch 1".

What is claimed is:

1. Drive arrangement for a motor vehicle, comprising
   a door or hatch which is movable by a motor,
   a planet gear, the planet gear having a drive shaft for coupling to the motor so as to be driven thereby, a driven shaft coupled to the motor vehicle door or hatch, a sun wheel, a planet carrier with planet wheels and a ring gear and
   a brake device with a brake,
   wherein one of the elements which include the sun wheel, planet carrier and ring gear is coupled to the drive shaft, a second of the elements which include the sun wheel, planet carrier and ring gear is coupled to the driven shaft and the brake device acting on a third of the elements which include the sun wheel, planet carrier and ring gear for braking or blocking the third element in a braking position thereof and the brake device enabling the third of the elements and thereby the motor vehicle door or hatch to be movable by hand unhindered by the drive arrangement in a release position of the braking device;
   wherein the drive shaft is coupled to the driven shaft in said braking position for enabling the motor vehicle door or hatch is able to be moved by the motor,
   wherein the brake device has a brake drive which is separate from said motor and which is operable for moving the brake device between said braking and release positions,
   wherein on one end the brake is pivotally supported by a pivot axle, and
   wherein the brake has an arc-shaped clip with an inner periphery which is matched to an outer periphery of said third of the elements which include the sun wheel, planet carrier and ring gear.

2. Drive arrangement as claimed in claim 1, wherein the inner periphery of the brake is matched to an outer periphery of the ring gear.

3. Drive arrangement as claimed in claim 1, wherein the third of the elements which include the sun wheel, planet carrier and ring gear has an outer jacket or side surface which, at least in part, comprises a brake lining.

4. Drive arrangement as claimed in claim 1, wherein said first of the elements which include the sun wheel, planet carrier and ring gear is the sun wheel, wherein the second of the elements which include the sun wheel, planet carrier and ring gear is the planet carrier, and wherein said third of the elements which include the sun wheel, planet carrier and ring gear is the ring gear.

5. Drive arrangement as claimed in claim 1, wherein the gearing comprises a worm gear.

6. Drive arrangement as claimed in claim 1, wherein the brake drive comprises a solenoid.

7. Drive arrangement for a motor vehicle, comprising
   a door or hatch which is movable by a motor,
   a planet gear, the planet gear having a drive shaft for coupling to the motor so as to be driven thereby, a driven shaft coupled to the motor vehicle door or hatch, a sun wheel, a planet carrier with planet wheels and a ring gear and
   a brake device with a brake,
   wherein one of the elements which include the sun wheel, planet carrier and ring gear is coupled to the drive shaft, a second of the elements which include the sun wheel, planet carrier and ring gear is coupled to the driven shaft and the brake device acting on a third of the elements which include the sun wheel, planet carrier and ring gear for braking or blocking the third element in a braking position thereof and the brake device enabling the third of the elements and thereby the motor vehicle door or hatch to be movable by hand unhindered by the Drive arrangement in a release position of the braking device;
   wherein the drive shaft is coupled to the driven shaft in said braking position for enabling the motor vehicle door or hatch is able to be moved by the motor,
   wherein the brake device has a brake drive which is separate from said motor and which is operable for moving the brake device between said braking and release positions, and
   wherein the brake and the brake drive are made jointly as an eddy current brake.

8. Drive arrangement as claimed in claim 7, wherein the first of the elements which include the sun wheel, planet carrier and ring gear is the sun wheel, wherein the second of the elements which include the sun wheel, planet carrier and ring gear the planet carrier, and wherein the third of the elements which include the sun wheel, planet carrier and ring gear is the ring gear.

9. Drive arrangement for a motor vehicle, comprising
   a door or hatch which is movable by a motor,
   a planet gear, the planet gear having a drive shaft for coupling to the motor so as to be driven thereby, a driven shaft coupled to the motor vehicle door or hatch, a sun wheel, a planet carrier with planet wheels and a ring gear and
   a brake device with a brake,
   wherein one of the elements which include the sun wheel, planet carrier and ring gear is coupled to the drive shaft, a second of the elements which include the sun wheel, planet carrier and ring gear is coupled to the driven shaft and the brake device acting on a third of the elements which include the sun wheel, planet carrier and ring gear for braking or blocking the third element in a braking position thereof and the brake device enabling the third of the elements and thereby the motor vehicle door or hatch to be movable by hand unhindered by the Drive arrangement in a release position of the braking device;
   wherein the drive shaft is coupled to the driven shaft in said braking position for enabling the motor vehicle door or hatch is able to be moved by the motor,
   wherein the brake device has a brake drive which is separate from said motor and which is operable for moving the brake device between said braking and release positions, and wherein the brake device is coupled via a further gearing to the third of the elements which include the sun wheel, planet carrier and ring gear to produce said braking or blocking.

10. Drive arrangement as claimed in claim 9, wherein the first of the elements which include the sun wheel, planet carrier and ring gear is the sun wheel, wherein the second of the elements which include the sun wheel, planet carrier and ring gear the planet carrier, and wherein the third of the elements which include the sun wheel, planet carrier and ring gear is the ring gear.

11. Drive arrangement as claimed in claim 9, wherein the brake is a frictional engagement brake for frictionally engaging said third of the elements which include the sun wheel, planet carrier and ring gear.

12. Drive arrangement as claimed in claim 9, wherein the brake drive of the brake has an electric motor and gearing.

13. Drive arrangement as claimed in claim 9, wherein the gearing comprises a worm gear.

14. Drive arrangement as claimed in claim 9, wherein the brake drive comprises a solenoid.

15. Drive arrangement as claimed in claim 9, wherein the further gearing is one of a spur gear, a planet gear, a toothed belt, and a gear chain.

16. Drive arrangement for a motor vehicle, comprising
a door or hatch which is movable by a motor,
a planet gear, the planet gear having a drive shaft for coupling to the motor so as to be driven thereby, a driven shaft coupled to the motor vehicle door or hatch, a sun wheel, a planet carrier with planet wheels and a ring gear and
a brake device with a brake,
wherein one of the elements which include the sun wheel, planet carrier and ring gear is coupled to the drive shaft, a second of the elements which include the sun wheel, planet carrier and ring gear is coupled to the driven shaft and the brake device acting on a third of the elements which include the sun wheel, planet carrier and ring gear for braking or blocking the third element in a braking position thereof and the brake device enabling the third of the elements and thereby the motor vehicle door or hatch to be movable by hand unhindered by the Drive arrangement in a release position of the braking device;
wherein the drive shaft is coupled to the driven shaft in said braking position for enabling the motor vehicle door or hatch is able to be moved by the motor,
wherein the brake device has a brake drive which is separate from said motor and which is operable for moving the brake device between said braking and release positions, and
wherein the brake drive comprises a permanent magnet which generates a magnetic field that causes a force to act on the brake in a direction toward the braking position, and an electromagnet which is triggerable for producing a magnetic field that acts to weaken or intensify the magnetic field generated by the permanent magnet depending on the polarity of the electromagnet when triggered.

17. Drive arrangement as claimed in claim 16, wherein the first of the elements which include the sun wheel, planet carrier and ring gear is the sun wheel, wherein the second of the elements which include the sun wheel, planet carrier and ring gear the planet carrier, and wherein the third of the elements which include the sun wheel, planet carrier and ring gear is the ring gear.

18. Drive arrangement as claimed in claim 16, wherein the brake is a frictional engagement brake for frictionally engaging said third of the elements which include the sun wheel, planet carrier and ring gear.

19. Drive arrangement as claimed in claim 16, wherein the braking position of the brake is produced by a first braking force resulting from the action of the magnetic field generated by the permanent magnet when the electromagnet is not triggered, and wherein the braking position of the brake is produced by a second braking force that is intensified relative to the first braking force when the electromagnet is triggered with a first polarity, and wherein the released position of the brake is produced when the electromagnet is triggered with a second polarity.

20. Drive arrangement as claimed in claim 19, wherein in the first braking force is roughly 50% of a maximum braking force and wherein in the second braking force is roughly 100% of the maximum braking force.

21. Drive arrangement as claimed in claim 16, wherein the permanent magnet is accommodated in a housing, the magnetic field generated by the permanent magnet at least partially penetrating the housing, and wherein the electromagnet is accommodated in the housing, the magnetic field generated by the electromagnet at least partially penetrating the housing.

22. Drive arrangement as claimed in claim 21, wherein the brake is in braking engagement with the housing in said braking position.

23. Drive arrangement as claimed in claim 16, wherein the brake is at least partially magnetic or magnetizable and wherein the magnetic field generated by the permanent magnet at least partially penetrates the brake when the brake is in said braking position.

24. Drive arrangement as claimed in claim 16, wherein a magnetic circuit of the permanent magnet an air gap is formed between the brake and the housing when the brake is in the released position, said air gap being closed when the brake is in the braking position.

25. Drive arrangement as claimed in claim 16, wherein the brake device has a spring element which pretensions the brake toward the released position, and wherein the permanent magnet and the spring element exert forces such that, when the brake is in the braking position, the force exerted on the brake by the permanent magnet prevails over the force exerted on the brake by the spring element, and when the brake is in the released position, the force exerted on the brake by the spring element prevails over the force exerted by the permanent magnet.

26. Drive arrangement as claimed in claim 25, wherein the spring element is a cup spring and wherein the brake is suspended on the brake device via the spring element.

27. Drive arrangement as claimed in claim 16, wherein the brake is coupled via a further gearing to the third of the elements which include the sun wheel, planet carrier, and ring gear, said further gearing having a gear wheel element that is connected to the brake and which engages said third of the elements which include the sun wheel, planet carrier, and ring gear.

28. Drive arrangement as claimed in claim 16, wherein the brake is adapted to execute a linear movement of roughly 0.6 mm between the released position and the brake position.

29. Drive arrangement as claimed in claim 21, wherein the housing is stationary and the brake is dynamically coupled to the third of the elements which include the sun wheel, planet carrier, and ring gear.

30. Drive arrangement as claimed in claim 16, wherein the brake is located on the third of the elements which include the sun wheel, planet carrier, and ring gear.

31. Drive arrangement as claimed in claim 21, wherein the housing is located on the third of the elements which include the sun wheel, planet carrier, and ring gear and wherein the brake is stationary with respect to motion of the third of the elements which include the sun wheel, planet carrier, and ring gear.

32. Drive arrangement as claimed in claim 16, wherein the permanent magnet is composed of several permanent magnets.

33. Drive arrangement as claimed in claim 16, further comprising an actuating element and wherein the braking device is adapted to moved into the released position when the actuating element is actuated.

* * * * *